United States Patent Office 3,594,475
Patented July 20, 1971

3,594,475
METHOD OF TREATING AND PREVENTING THE SIDE EFFECTS OF ANTIBIOTICS
Masatoyo Akiyoshi, Yokohama, Kiichi Satoh, Tokorozawa-shi, and Ken Hamaguchi, Tokyo, Japan, assignors to Kyowa Hakko Kogyo Co., Ltd., Tokyo, Japan
Filed Sept. 11, 1968, Ser. No. 759,017
Claims priority, application Japan, Apr. 24, 1968, 43/27,045
Int. Cl. A61k 21/00
U.S. Cl. 424—181
14 Claims

ABSTRACT OF THE DISCLOSURE

The present disclosure is directed to a method of treating and preventing the adverse side effects resulting from the administration of antibiotics such as streptomycin, kanamycin, etc., in treating diseases such as tuberculosis which comprises treating said diseases with said antibiotics together with an effective amount of nicotinamide adenine dinucleotide. Among the side effects resulting from the administration of said antibiotics, hearing impairment is frequently included. The nicotinamide adenine dinucleotide can be administered to a patient already affected by the side effects resulting from a previous treatment with antibiotics or can be administered together with the particular antibiotic to prevent the said side effects.

---

Figure 1:
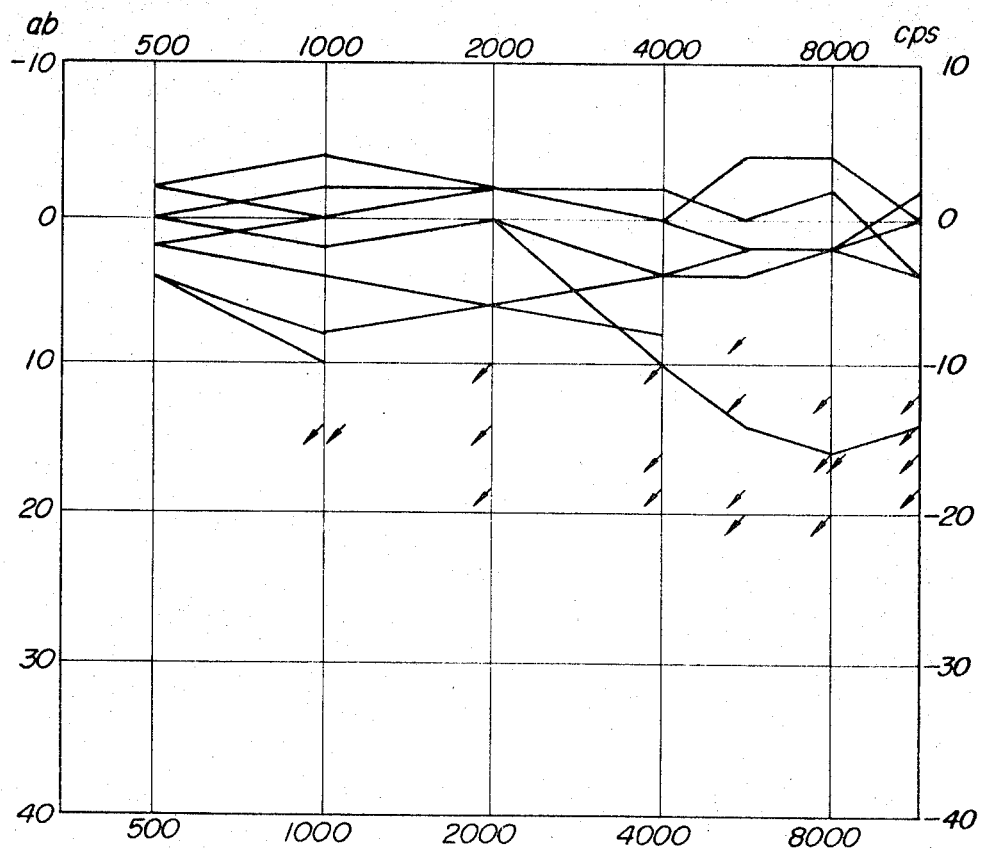

The present invention relates to a process for preventing hearing impairment brought about by side effects due to the administration of chemicals. More particularly, the present invention concerns a method for preventing hearing impairment due to side effects created by the administration of antibiotics wherein nicotinamide adenine dinucleotide is administered in combination with the antibiotics.

The development of antibiotics has remarkably progressed in recent years and various novel antibiotics have been produced through recent research. In fact, many of the acute and chronic diseases due to bacteria and Eumycetes can be effectively treated and in some cases cured by the administration of antibiotics. For example, the advent of streptomycin and kanamycin has resulted in the rapid decrease in mortality due to tuberculosis, and the said antibiotics have made a tremendous contribution to the effective treatment and cure of tuberculosis.

Recently, however, there has been noted the creation of side effects in the administration of oligosaccharide-type antibiotics, such as streptomycin and kanamycin, when they are continuously administered over a long period of time, particularly in case of tuberculosis. Among these side effects, hearing impairment is particularly noticeable and is of such a magnitude that it is considered a serious disease which can produce permanent hearing impairment.

It is presently estimated that those who are suffering from the disease creating hearing defects are considerable in number. In an attempt to cure such hearing losses, vitamin $B_1$, ATP, pyrophosphoric acid, thictic acid, and DBCC (active type $B_{12}$) have been administered heretofore, but none of these materials have ben effective in the remission and/or prevention of the disease.

An object of the present invention is to provide a process for preventing and curing hearing impairment due to the administration of chemicals.

Another object of the present invention is to provide an improved method for preventing hearing impairment due to side effects created by the administration of antibiotics such as oligosaccharide-type antibiotics, for example streptomycin, kanamycin, and the like.

A further object of the present invention is to provide an improved process for both curing and preventing hearing impairment.

Other objects and further scope of applicability of the present invention will become apparent from the detailed description given hereinafter; it should be understood, however, that the detailed description and specific examples, while indicating prefererd embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process for the treatment of disease, for example tuberculosis, with antibiotics can be achieved without experiencing undesirable side effects by the addition of nicotinamide adenine dinucleotide to the particular antibiotic being administered. For example, according to the present invention a process has been developed for preventing and curing hearing impairment due to the side effects produced in the long-term administration of oligosaccharide-type antibiotics, such as streptomycin and kanamycin.

The present invention is characterized by the successive or simultaneous administration of nicotinamide adenine dinucleotide with the particular antibiotic.

In the cure and prevention of hearing impairment in accordance with the present invention, the dose of nicotinamide adenine dinucleotide to be administered varies depending on the extent of hearing impairment and on the dose of antibiotic employed. However, in the case where hearing impairment is treated by the administration of nicotinamide adenine dinucleotide in the form of tablets, it is considered effective to use said material at a dose of about 300 mg. or more, preferably about 600 to 1200 mg./day/patient, for about 2 months or more. When nicotinamide adenine dinucleotide is administered by way of intramuscular injection in combination with kanamycin, for example, it is effective to use the nicotinamide adenine dinucleotide at a dose of about 20 mg. or more, preferably about 40 mg. per 200 mg. of the antibiotic.

The present invention will be illustrated by the examples below, but they are not to be considered as limiting. In each of the examples, hearing impairment preventing (inhibiting) test on animals is carried out according to the following procedure: Prior to the test, 10 Hartley strain guinea pigs weighing about 250 grams in one group are measured for the threshold according to the Preyer's pinna reflex test. Subsequently, a predetermined amount of kanamycin is intramuscularly injected into the pigs every day for a period of 28 days and a predetermined amount of nicotinamide adenine dinucleotide is administered orally or intramuscularly to the pigs. Then, the threshold at the Preyer's pinna reflex test is measured 2 times a week in animals which are administered kanamycin alone or kanamycin in combination with nicotinamide adenine dinucleotide. Thereafter, the observation is made on animals classified according to the threshold into 4 groups consisting of normal hearing, and slight, moderate and severe hearing impairment.

In addition, the animals are subjected to the histopathological examination by the Wittmaack's fixation method, which is followed by decalcification by Plank's method, and dehydration, and final celloidin embedding, sectioning by serial horizontal sections of cochlea and staining by haematoxylin-eosine. Furthermore, comparative tests by the administration of ATP, vitamin $B_1$ and DBCC are simultaneously carried out.

The above-mentioned measuring method is described in detail in Chemotherapy, volume 15, No. 4, pages 501 to 512, July 1967.

The drawings referred to in the following examples show the results of hearing tests in cases where chemicals are administered independently and in cases where they are administered in combination with nicotinamide adenine dinucleotide.

EXAMPLE 1

Figure 2:
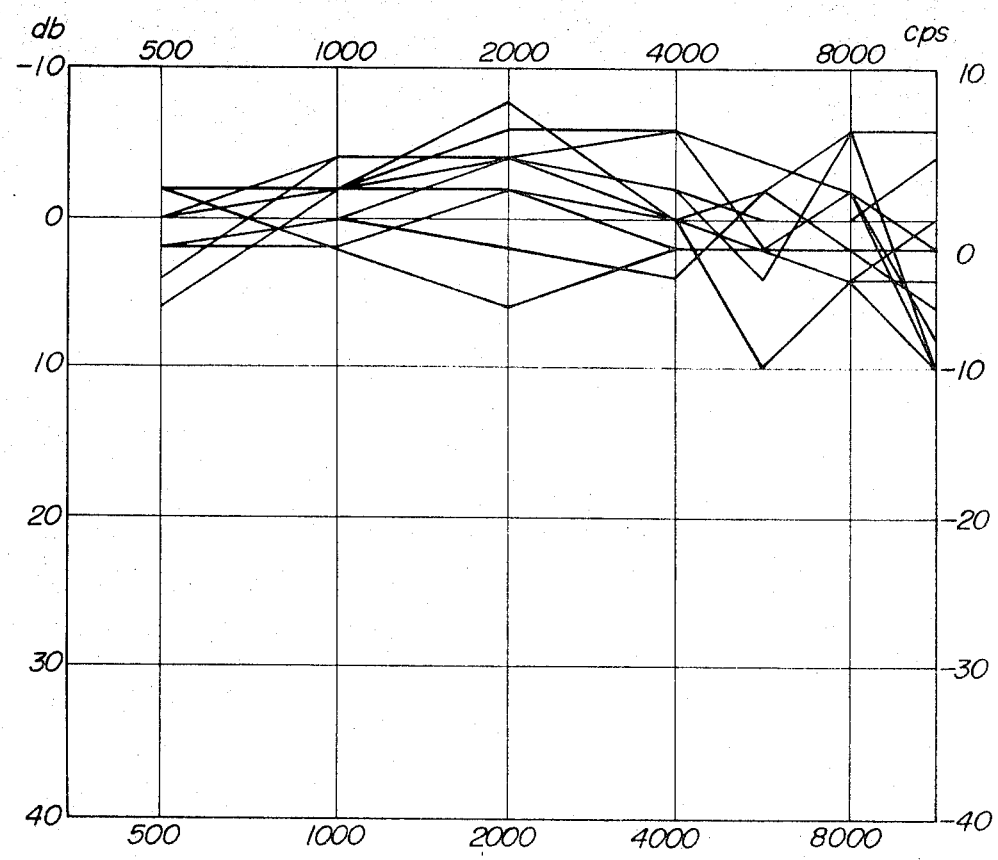

In this example two groups each consisting of 10 Hartley strain guinea pigs individually weighing about 250 g. were used. The animals of each group were intramuscularly injected every day with 400 mg./kg. of kanamycin for a period of 28 days. To the animals of one group, nicotinamide adenine dinucleotide or a preparation containing this material was orally administered for 28 consecutive days at a dose of 400 mg./kg. Thereafter, the Preyer's pinna reflex test was carried out on the animals to which kanamycin was administered independently as well as on those to which nicotinamide adenine dinucleotide was administered in combination with kanamycin. The thresholds thus obtained are shown in FIGS. 1 and 2. As can be readily seen in FIG. 1, among the animals to which kanamycin was independently administered, 4 animals showed severe hearing impairment from the 8th day after administration and at the very latest from the 14th day and the hearing was not restored before the 28th day. Among the remaining 6 animals, 2 appeared to suffer from moderate hearing impairment. On the other hand, in the animals to which nicotinamide adenine dinucleotide was administered in combination with kanamycin, there was found no animal suffering from hearing impairment, as can be readily seen in FIG. 2. All animals were normal in the pinna reflex test, and also no abnormal case was observed in the histopathological examination on serial sections of cochlea. Thus, the preventive effect of nicotinamide adenine dinucleotide on hearing impairment due to kanamycin was apparently shown.

EXAMPLE 2

Figure 3:
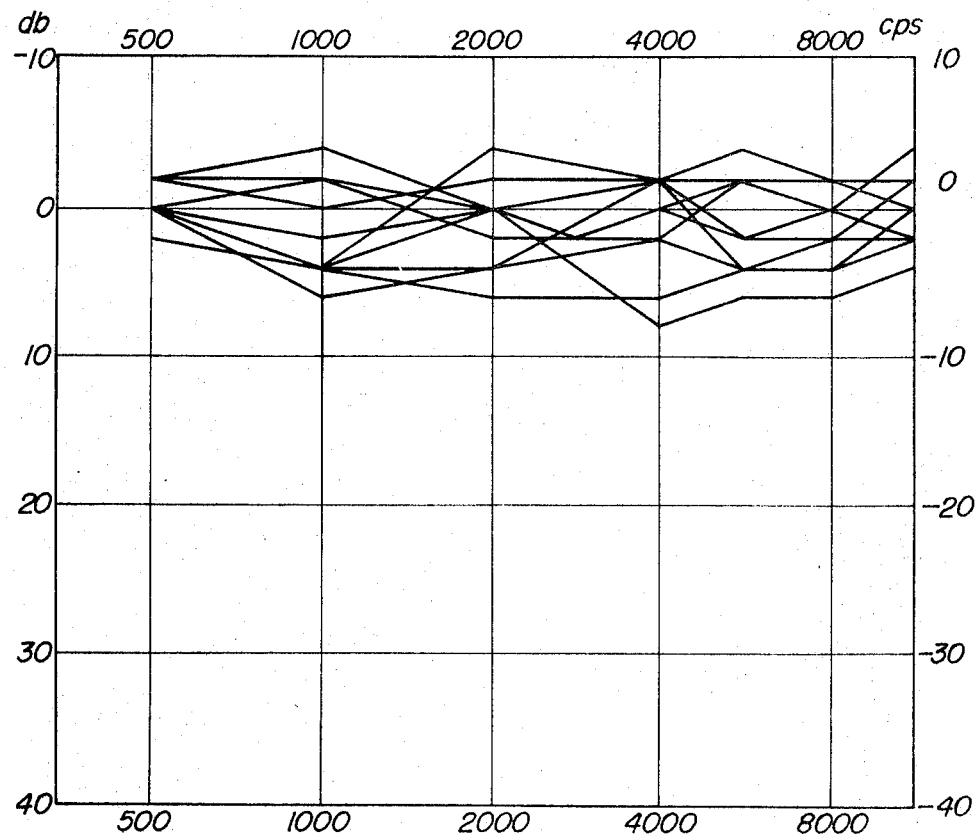

Under the same conditions as in Example 1, the animals were intramuscularly injected every day with 400 mg./kg. of kanamycin for a period of 28 days. Thereafter, the animals of one group were intramuscularly injected every day with 40 mg./kg. of nicotinamide adenine dinucleotide or an nicotinamide adenine dinucleotide-containing preparation for a period of 28 days, and the pinna test was subsequently carried out. The results are shown in FIG. 3. As readily seen in FIG. 3, 1 animal showed a slight impairment of hearing. However, no abnormal case was observed at all in the hostopathological examination on the serial sections of cochlea. Thus, the preventive effect of nicotinamide adenine dinucleotide on hearing impairment due to kanamycin was again proved.

EXAMPLE 3

Figure 4:
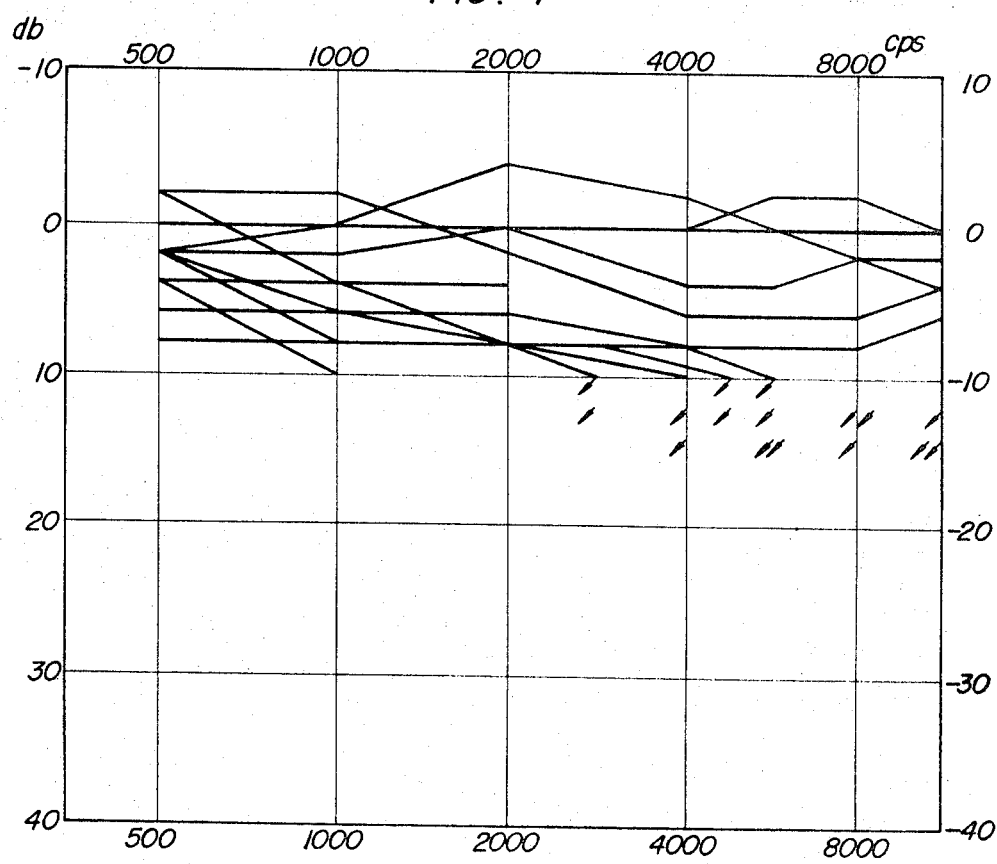

Under the same conditions as in Example 1, the animals were intramuscularly injected every day with 400 mg./kg. of kanamycin for a period of 28 days. To the animals of one group a compound vitamin comprising 40 mg. of $B_1$ and 40 mg. of $B_6$ was given every day at a dose of 40 mg./kg. by intramuscular injection. Thereafter, the pinna reflex test was carried out. The results are shown in FIG. 4. As can be readily seen in FIG. 4, some abnormal cases were observed in the animals to which the compound vitamin were administered in combination, and no preventive effect of the compound vitamin was exhibited.

EXAMPLE 4

Figure 5:
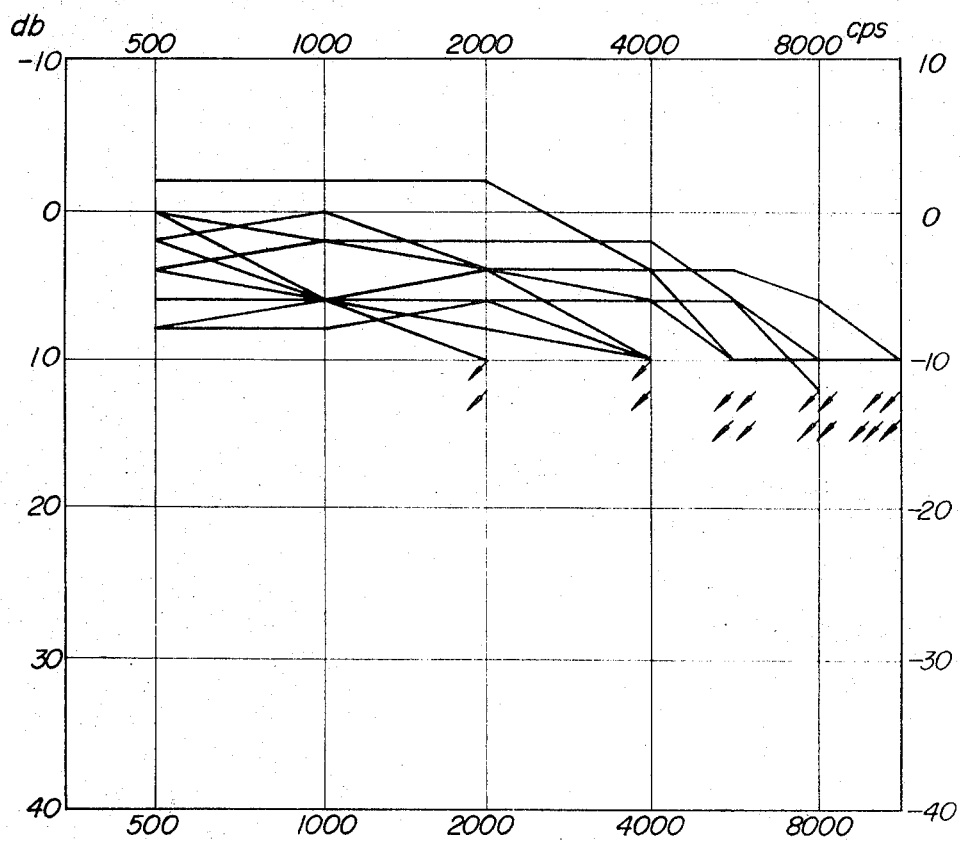

Under the same conditions as in Example 1, the animals were intramuscularly injected every day with 400 mg./kg. of kanamycin for a period of 28 days. To the animals of one group, 40 mg./kg. vitamin $B_1$ was given every day by intramuscular injection or otherwise. Thereafter, the pinna reflex test was carried out. The results are shown in FIG. 5. As can be readily seen from FIG. 5, some abnormal cases were observed in the animals to which vitamin $B_1$ was administered in combination with kanamycin, and no preventive effect of vitamin $B_1$ was exhibited.

EXAMPLE 5

Figure 6:
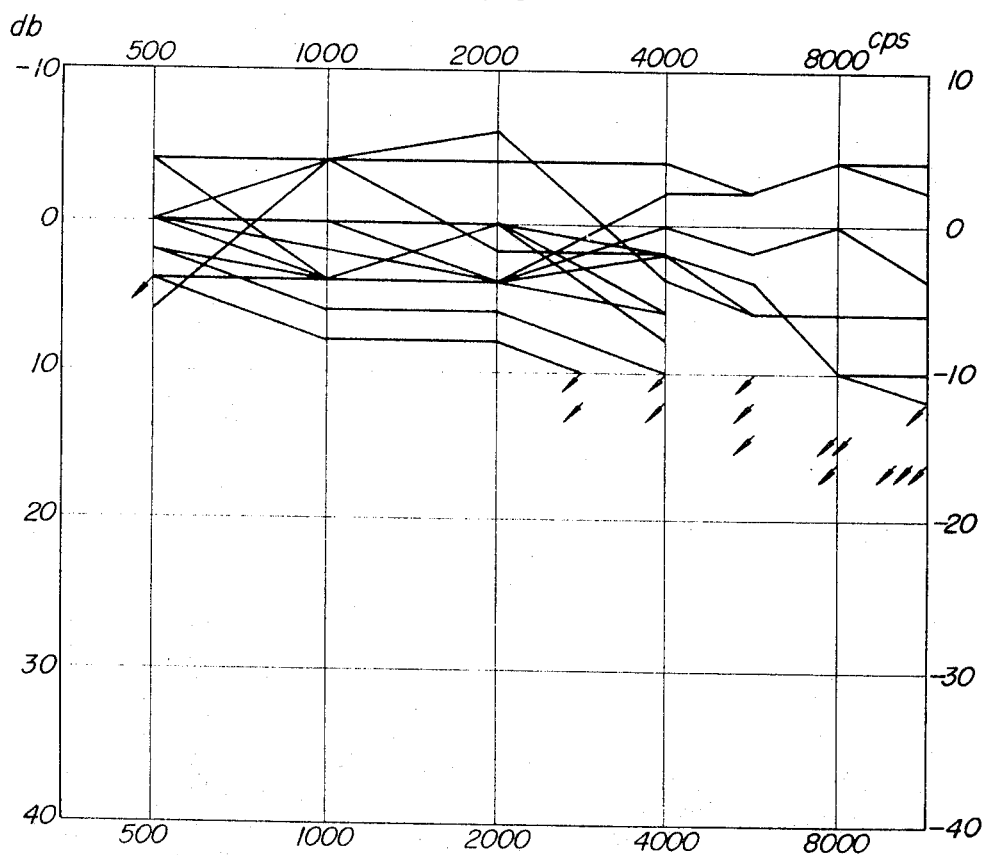

Under the same conditions as in Example 1, the animals were intramuscularly injected every day with 400 mg./kg. of kanamycin for a period of 28 days. To the animals of one group, 4 mg./kg. ATP (adenosine triphosphate) was given every day by intramuscular injection or orally. Thereafter, the pinna reflex test was carried out. The results are shown in FIG. 6. As can be readily seen in FIG. 6, some abnormal cases were observed in the animals to which ATP was administered, and no preventive effect of ATP was recognized.

EXAMPLE 6

Figure 7:
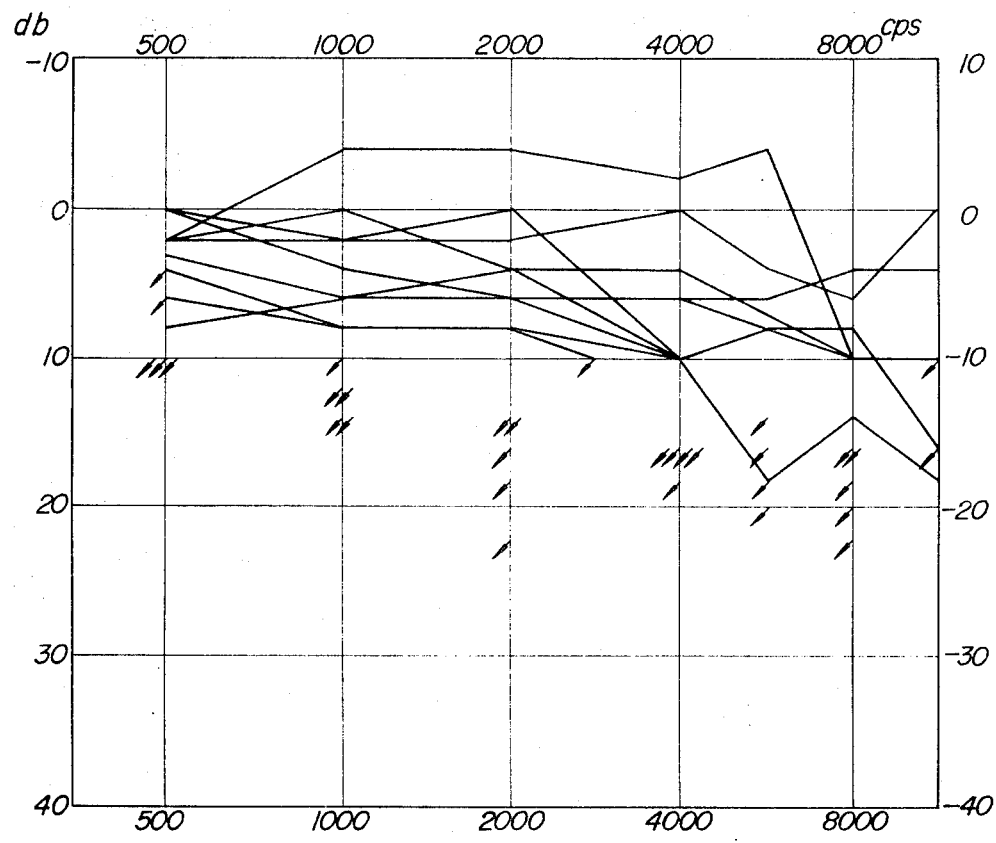

Under the same conditions as in Example 1, the animals were intramuscularly injected every day with 400 mg./kg. of kanamycin for a period of 28 days. To the animals of one group, 250 $\mu$g./kg. of DBCC was administered every day by intramuscular injection. Thereafter, the pinna reflex test was carried out. The results are shown in FIG. 7. As seen in FIG. 7, some abnormal cases were observed among the animals to which DBCC was administered in combination with kanamycin, and no preventive effect of DBCC was recognized.

The following table show the changes in the audiogram for a number of patients to which various antibiotics and nicotinamide adenine dinucleotide have been administered.

TABLE 1.—CLINICAL DATA

| Patient No. | Chemicals administrated | | Changes in audiogram (between decibel threshold) db at 500 cycles | | |
|---|---|---|---|---|---|
| | Before administration of NAD | After administration of NAD | Before administration of NAD | After administration of NAD | Evaluation |
| 1 | KM, 367 g. | KM, 4 g. | 0 / 10 | 5 / 5 | −− / ++ |
| 2 | KM, 85 g. | KM, 4 g., TH, CS | 30 / 0 | 20 / 0 | + / + |
| 3 | KM, 6 g. | INAH, SF | 10 / 5 | 10 / 10 | + / − |
| 4 | | SM, 21 g. | 5 / 0 | 0 / 0 | ++ / + |
| 5 | | KM, 26 g., INAH, PAS, SF | 5 / 5 | 10 / 15 | − / − |
| 6 | SM, 70 g., KM, 16 g. | CS, TH | 5 / 5 | 5 / 0 | + / ++ |
| 7 | | KM, 28 g. | 40 / 40 | 50 / 50 | − / − |
| 8 | | SM, 2 g., KM, 21 g., PAS, INAH | 5 / 5 | 0 / 5 | ++ / + |
| 9 | | SM, 20 g., INAH, PAS | 5 / 10 | 0 / 5 | ++ / ++ |

TABLE 2.—CLINICAL DATA

| Patient No. | Chemicals administrated | | Changes in audiogram (between decibel threshold) db at 1000 cycles | | |
|---|---|---|---|---|---|
| | Before administration of NAD | After administration of NAD | Before administration of NAD | After administration of NAD | Evaluation |
| 1 | KM, 367 g | KM, 4 g | 5 / 5 | 5 / 0 | + / ++ |
| 2 | KM, 85 g | KM, 4 g., TH, CS | 30 / 0 | 25 / 0 | ++ / + |
| 3 | KM, 6 g | INAH, SF | 20 / 5 | 5 / 10 | ++ / − |
| 4 | | SM, 21 g | 0 / 0 | 0 / 0 | + / + |
| 5 | | KM, 26 g., INAH, PAS, SF | 10 / 10 | 15 / 15 | − / − |
| 6 | SM, 70 g., KM, 16 g | CS, TH | 5 / 5 | 5 / 5 | + / + |
| 7 | | KM, 28 g | 45 / 50 | 50 / 55 | − / − |
| 8 | | SM, 2 g., KM, 21 g., PAS, INAH | 5 / 5 | 5 / 0 | + / ++ |
| 9 | | SM, 20 g., INAH, PAS | 5 / 10 | 0 / 5 | ++ / ++ |

TABLE 3.—CLINICAL DATA

| Patient No. | Chemicals administrated | | Changes in audiogram (between decibel threshold) db at 3000 cycles | | |
|---|---|---|---|---|---|
| | Before administration of NAD | After administration of NAD | Before administration of NAD | After administration of NAD | Evaluation |
| 1 | KM, 367 g | KM, 4 g | 5 / 0 | 5 / 0 | + / + |
| 2 | KM, 85 g | KM, 4 g., TH, CS | 50 / 0 | 40 / 0 | ++ / + |
| 3 | KM, 6 g | INAH, SF | 15 / 10 | 10 / 15 | ++ / − |
| 4 | | SM, 21 g | 0 / 0 | 0 / −5 | + / ++ |
| 5 | | KM, 26 g., INAH, PAS, SF | 15 / 0 | 15 / 10 | + / − |
| 6 | SM, 70 g., KM, 16 g | CS, TH | 0 / 5 | 0 / 0 | + / ++ |
| 7 | | KM, 28 g | 55 / 70 | 55 / 65 | + / ++ |
| 8 | | SM, 2 g., KM, 21 g., PAS, INAH | 0 / 5 | 0 / 5 | + / ++ |
| 9 | | SM, 20 g., INAH, PAS | 10 / 20 | 5 / 20 | ++ / + |

TABLE 4.—CLINICAL DATA

| Patient No. | Chemicals administrated | | Changes in audiogram (between decibel threshold) db at 500 cycles | | |
|---|---|---|---|---|---|
| | Before administration of NAD | After administration of NAD | Before administration of NAD | After administration of NAD | Evaluation |
| 1 | KM, 367 g | KM, 4 g | 55 / 45 | 65 / 45 | − / + |
| 2 | KM, 85 g | KM, 4 g., TH, CS | 40 / 10 | 45 / 10 | − / + |
| 3 | KM, 6 g | INAH, SF | 55 / 25 | 55 / 50 | + / − |
| 4 | | SM, 21 g | 0 / 0 | 5 / 5 | − / − |
| 5 | | KM, 26 g., INAH, PAS, SF | 50 / 25 | 55 / 30 | − / − |
| 6 | SM, 70 g., KM, 16 g | CS, TH | 45 / 45 | 55 / 60 | − / − |
| 7 | | KM, 28 g | 70 / 90 | 90 / 90 | − / + |
| 8 | | SM, 2 g., KM, 21 g., PAS, INAH | 15 / 25 | 15 / 30 | + / − |
| 9 | | SM, 20 g., INAH, PAS | 15 / 25 | 15 / 20 | + / ++ |

Note.—KM=Kanamycin. SM=Streptomycin. TH=Ethionamide. CS=Cycloserine. INAH=Isonicotinic acid hydrazide. PAS=Para-aminosalicylic acid. SF=Sulfasoxazole.

One dose of SM or KM contains 1 g. of the chemical.

As is clear from the above tables, the effective rate of NAD are 12/18, 13/18, 16/18 and 7/18 at 500, 1,000, 3,000 and 5,000 cycles, respectively. Thus, it can be considered that the administration of NAD is generally very effective in preventing hearing impairment.

It is claimed:

1. A method for treating and preventing hearing impairment resulting from the administration of oligosaccharide-type antibiotics in treating diseases which comprises orally or intramuscularly administering to a diseased patient (a) about 300 to 1200 mg. per day, in the case of oral administration, or (b) about 20 to 40 mg. per 200 mg. antibiotic, in the case of intramuscular administration, of nicotinamide adenine dinucleotide.

2. The method of claim 1, wherein the nicotinamide adenine dinucleotide is administered to a patient already affected by the side effects resulting from a previous treatment with antibiotics.

3. The method of claim 2, wherein the nicotinamide adenine dinucleotide is administered orally in tablet form at a dosage of at least 300 mg. per day for at least about two months.

4. The method of claim 1, wherein the nicotinamide adenine dinucleotide is administered by intramuscular injection at a dose of at least about 20 mg. per 200 mg. of the antibiotic.

5. The method of claim 1, wherein the nicotinamide adenine dinucleotide is administered at the same time as the administration of said antibiotic.

6. The method of claim 1, wherein the nicotinamide adenine dinucleotide is administered subsequent to the administration of said antibiotic.

7. The method of claim 1, wherein the nicotinamide adenine dinucleotide is administered orally in tablet form at a dosage of about 600 to 1200 mg. per day.

8. The method of claim 1, wherein the nicotinamide adenine dinucleotide is administered by intramuscular injection at a dose of about 40 mg. per 200 mg. of the antibiotic.

9. A method for treating and preventing the side effects of hearing impairment resulting from the administration of oligosaccharide-type antibiotics to patients afflicted with tuberculosis which comprises orally or intramuscularly administering to said patients (a) about 300 to 1200 mg. per day, in the case of oral administration, or (b) about 20 to 40 mg. per 200 mg. of antibiotic, in the case of intramuscular administration, of nicotinamide adenine dinucleotide.

10. The method of claim 9, wherein the antibiotic is streptomycin or kanamycin.

11. The method of claim 9, wherein the nicotinamide adenine dinucleotide is administered orally in tablet form at a dosage of about 600 to 1200 mg. per day.

12. The method of claim 9, wherein the nicotinamide adenine dinucleotide is administered by intramuscular injection at a dose of about 40 mg. per 200 mg. of the antibiotic.

13. The method of claim 9, wherein the nicotinamide adenine dinucleotide is administered at the same time as the administration of said antibiotic.

14. The method of claim 9, wherein the nicotinamide adenine dinucleotide is administered subsequent to the administration of said antibiotic.

References Cited

UNITED STATES PATENTS 3,174,963    3/1965    Farhi _____ 424—180

ALBERT T. MEYERS, Primary Examiner

D. M. STEPHENS, Assistant Examiner

U.S. Cl. X.R.

424—263